US012175953B2

(12) United States Patent
Takara

(10) Patent No.: US 12,175,953 B2

(45) Date of Patent: Dec. 24, 2024

(54) STRING INSTRUMENT

(71) Applicant: Teruyuki Takara, Uruma (JP)

(72) Inventor: Teruyuki Takara, Uruma (JP)

( * ) Notice: Subject to any disclaimer, the term of this patent is extended or adjusted under 35 U.S.C. 154(b) by 214 days.

(21) Appl. No.: 18/006,636

(22) PCT Filed: Oct. 28, 2021

(86) PCT No.: PCT/JP2021/041815

§ 371 (c)(1),
(2) Date: Jan. 24, 2023

(87) PCT Pub. No.: WO2022/092327

PCT Pub. Date: May 5, 2022

(65) Prior Publication Data

US 2023/0298545 A1 Sep. 21, 2023

(30) Foreign Application Priority Data

Oct. 29, 2020 (JP) ................................ 2020-192067

(51) Int. Cl.

*G10D 3/12* (2020.01)
*G10D 1/08* (2006.01)
*G10D 3/04* (2020.01)
*G10D 3/06* (2020.01)

(52) U.S. Cl.

CPC ................ *G10D 3/12* (2013.01); *G10D 1/08* (2013.01); *G10D 3/04* (2013.01); *G10D 3/06* (2013.01)

(58) Field of Classification Search

CPC .. G10D 3/12; G10D 1/08; G10D 3/04; G10D 3/06; G10D 3/02

See application file for complete search history.

(56) References Cited

U.S. PATENT DOCUMENTS 4,750,400 A * 6/1988 Milne .................... G10H 3/185 D17/14

FOREIGN PATENT DOCUMENTS

JP S55-91591 U 6/1980
JP H09-190176 A 7/1997
JP 2014-504742 A 2/2014

OTHER PUBLICATIONS

International Search Report for the corresponding application No. PCT/JP2021/041815, dated Apr. 19, 2022, with English translation.

* cited by examiner

*Primary Examiner* — Kimberly R Lockett

(74) *Attorney, Agent, or Firm* — LUCAS & MERCANTI, LLP

(57) ABSTRACT

A string instrument contains: a string holding member that holds the end portions of strings; and a body reinforcement member that is inside a body portion and has a joining surface adhered to a front panel, a rear panel, and a side panel. A facing surface of a string holding section of the string holding member has a joining surface fixedly adhered to the front panel, the side panel, and the body reinforcement member. A portion of the front panel and the body reinforcement member is cut out, and the string holding member is disposed as fixedly adhered to the body reinforcement member.

3 Claims, 8 Drawing Sheets

STRING INSTRUMENT

CROSS REFERENCE TO RELATED APPLICATION

This Application is a 371 of PCT/JP2021/041815 filed on Oct. 28, 2021, which, in turn, claims priority of Japanese Patent Application No. 2020-192067 filed on Oct. 29, 2020, and the above applications are incorporated herein by reference.

TECHNICAL FIELD

The present invention relates to a string instrument.

BACKGROUND ART

Among conventional string instruments, in a classic/acoustic guitar as shown in FIGS. 5 and 6, a saddle type was used in which a saddle (63) having holes through which strings are passed is adhered to a front panel (61).

As shown in FIG. 9, in a solid-type electric guitar in which there is no resonating space in the body portion, a square metal string holding member is fastened to the outside of the front panel using screws.

As shown in FIG. 10, in a hollow-type guitar in which there is a resonating space in the body portion, a metal or wooden string holding member is fastened to the outside of a bottom surface of the main body using screws, or is hooked using a cord.

Non-Patent Publication 1: FIG. 9—Example of string holding member of electric guitar
From homepage of Ishibashi Music
https://www.ishibashi.co.jp/Non-Patent
Publication 2: FIG. 10—Example of string holding member in guitar with resonating space
From homepage of Ishibashi Music
https://www.ishibashi.co.jp/feature/12-dupont

SUMMARY OF INVENTION

Technical Problem

In a classic/acoustic guitar like that described above, a saddle (63) is used as the string holding member. However, the saddle (63) as shown in FIG. 8 is held by only the strength of the adhesive on the front panel (61), and thus a force (b2) pulling away from the front panel (61) is constantly acting due to the tension (b) of the strings (60). Therefore, there are many examples in which the saddle (63) yields to the tension (b) of the strings (60) and ends up being pulled off or damaged. Further, since an excessive pushing force (b1) acts on the front panel (61), there are also cases in which the front panel (61) becomes depressed near the saddle (63). Thus, there is a problem among saddle-type guitars in that these guitars lack durability and have a short lifespan.

The screw-fastened metal string holding member on the outside of the main body shown in FIG. 9 is effective only in electric guitars in which the body portion is not hollow and thus screw fastening is possible.

In the metal or wooden string holding member which is fastened or hooked by a cord onto the outside of the bottom surface corresponding to a guitar having a resonating space in the body portion as shown in FIG. 10, it is common for loosening to develop in the string holding member that is fastened with screws or a cord, and this can lead to damage of the string holding section or fastening portion onto which force is applied. Thus, these guitars lack strength and the lifespan of the instrument main body is short. Further, in the case of a plucked string instrument of the external fastening type, vibration of the strings is not easily transmitted to the resonating space in the body portion, and thus only a small sound can be output by a single instrument. Therefore, there is a problem in that the volume must be adjusted with an electric amplifier.

In this way, there have been problems in the conventional structures in that they are difficult to maintain over a long duration while maintaining the performance as a string instrument, and it is difficult to obtain a sufficient volume.

An object of the present invention is to provide a string instrument with which the durability of the instrument can be increased and the lifespan can be extended, and with which the sound quality and volume are improved by integrating a string holding member (15) with a body portion (3) so that sound can be easily transmitted to a resonating space.

Solution to Problem

A string instrument according to the present invention consists of: a body portion (3) that is constituted by a front panel (11), a back panel (12), and a side panel (8), and that forms a space for resonating: a neck portion (2) that is connected to the body portion (3); a head portion (1) that is connected to an upper end of the neck portion (2), and that includes pegs (4): a string holding member (15) that is disposed at a lower end of the front panel (11); strings (10) that are extended across the neck portion (2), the strings being held at one end by the string holding member (15) and held at the other end by the pegs (4): a nut (5) that is disposed at an upper end of the neck portion (2) and that supports a middle portion of the strings (10); and a bridge (14) that is held on a saddle (13) disposed near the middle of the front panel (11). A body reinforcement member (16) is disposed on the inside of the body portion (3), and has a joining surface which is adhered to the front panel (11), the back panel (12), and the side panel (8). An opposing surface of a string holding section of the string holding member (15) has a joining surface which is fixed and adhered to the front panel (11), the side panel (8), and the body reinforcement member (16).

A portion of the front panel (11) and the body reinforcement member (16) is cut out, and the string holding member (15) is disposed therein so as to be fixed and adhered to the body reinforcement member (16).

The width and length of the joining surface of the body reinforcement member (16) that is joined to the string holding member (15) are set to be 1.2 to 1.5 times greater than the width and length of the string holding member (15).

Further, the strings (10) are held by the string holding member (15), and the saddle (13) functions to prevent any deviation between the bridge (14) and the strings (10).

Effects of Invention

In the present invention, the string holding member (15) cuts out a portion of the front panel (11) and the body reinforcement member (16) so as to be fixedly adhered to and integrated with the body reinforcement member (16). Due to this configuration, the present invention can provide a string holding structure that clearly has higher durability and stability over a long period compared to the string holding structure of a conventional string instrument.

In the present invention, the force (b2) that existed in the prior art and acted so as to pull off the saddle (63) can be eliminated from the tension (b) of the strings (60) shown in FIG. 8, and further an excessive force (b1) which causes a depression in the front panel (61) can be alleviated. In addition, since the string holding member (15) is fixedly adhered to and integrated with all of the members that constitute the body portion (3) as shown in FIG. 7, an improved structure can be provided which disperses a tension (a) of the strings (10) and exhibits superior strength, durability, and lifespan.

In the present invention, the width and length of the joining surface of the body reinforcement member (16) that is joined to the string holding member (15) are set to be 1.2 to 1.5 times greater than the width and length of the string holding member. Due to this configuration, the adhesion strength between the body reinforcement member (16) and the front panel (11) is increased, and the transmission of vibration of the strings (10) to the front panel (11) is improved. Further, the string holding member (15) can be stably held.

In the present invention, the string holding member (15) is closely adhered, via the body reinforcement member (16), to all of the members constituting the body portion (3). Therefore, vibration of the strings (10) can be effectively transmitted to the resonating space section of the body portion (3). Accordingly, the sound quality of the stringed instrument can be remarkably improved and the musical performance expressive capability can be enhanced, and further a robust sound volume can be emitted with a single instrument without depending on an electric amplifier.

In the present invention, the strings (10-2) between the bridge (14) and the string holding member (15) as shown in FIG. 1, which did not exist in conventional classic/acoustic guitars and the like, fulfill a role as resonance strings, and can resonate with a performed sound so as to amplify the sound volume and strengthen a harmonic overtone. Therefore, an acoustic effect which is clearly superior to that of a conventional string instrument can be obtained, and an excellent sound quality can be provided.

In the present invention, the string holding member (15), which did not exist in conventional classic/acoustic guitars and the like, is provided to hold the strings (10), and the saddle (13) functions to prevent any deviation between the bridge (14) and the strings (10). Since the force (b2) that pulls on the adhesive surface with the front panel (11) is eliminated, the embodiment of the saddle (13) can be reduced in size, and the decorative degree of freedom can be increased. Variation of the string holding member is also possible, as in the exemplary front views (15-1, 15-2, 15-3) shown in FIG. 1. Thus, an extremely innovative, characteristic, and unique outer appearance which did not exist in conventional string instruments can be imparted.

DESCRIPTION OF EMBODIMENTS

Figure 1:
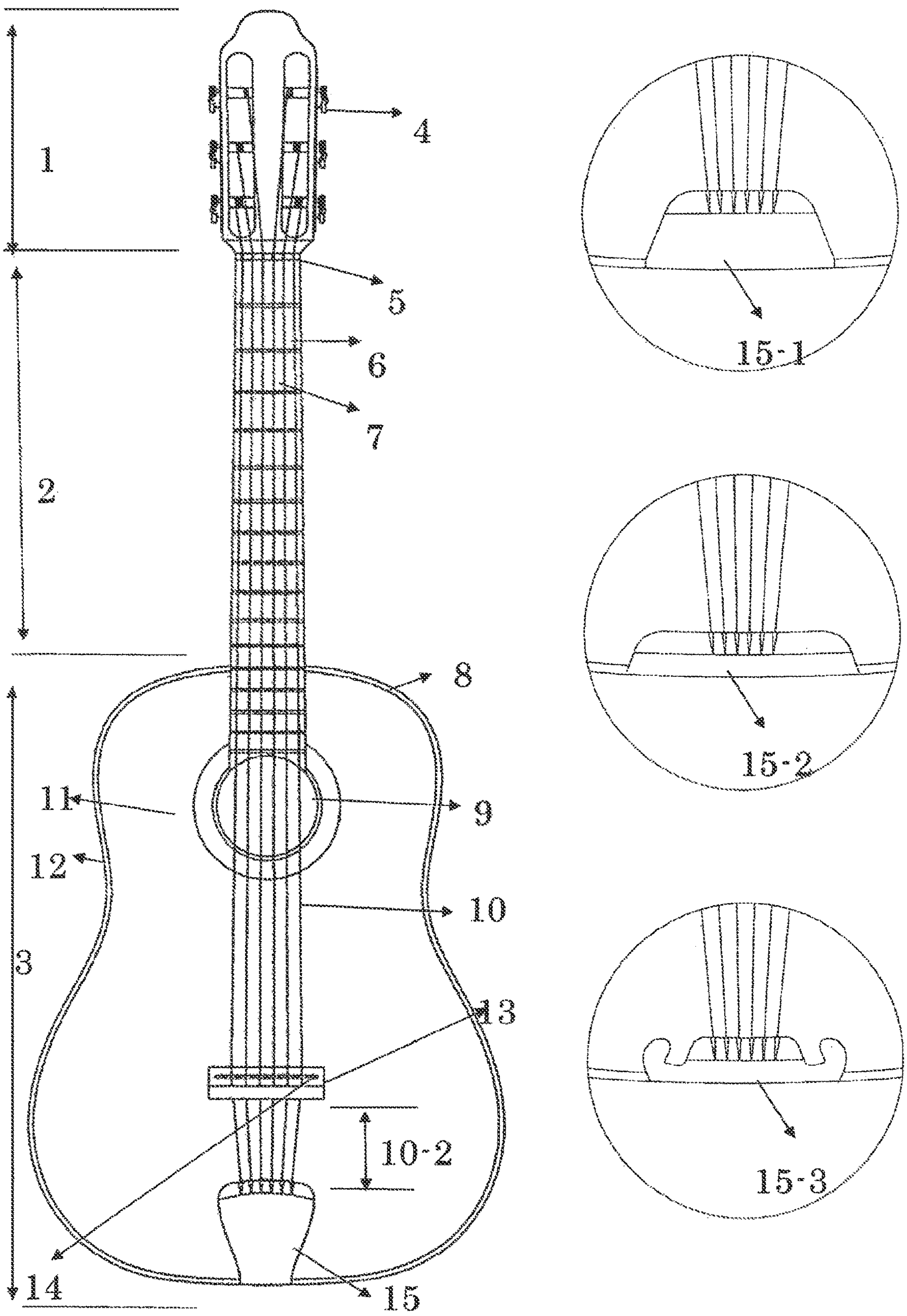
FIG. 1 is a front view illustrating one embodiment in which the present invention is applied to a string instrument, and also includes front views illustrating examples of the string holding member.
Figure 2:
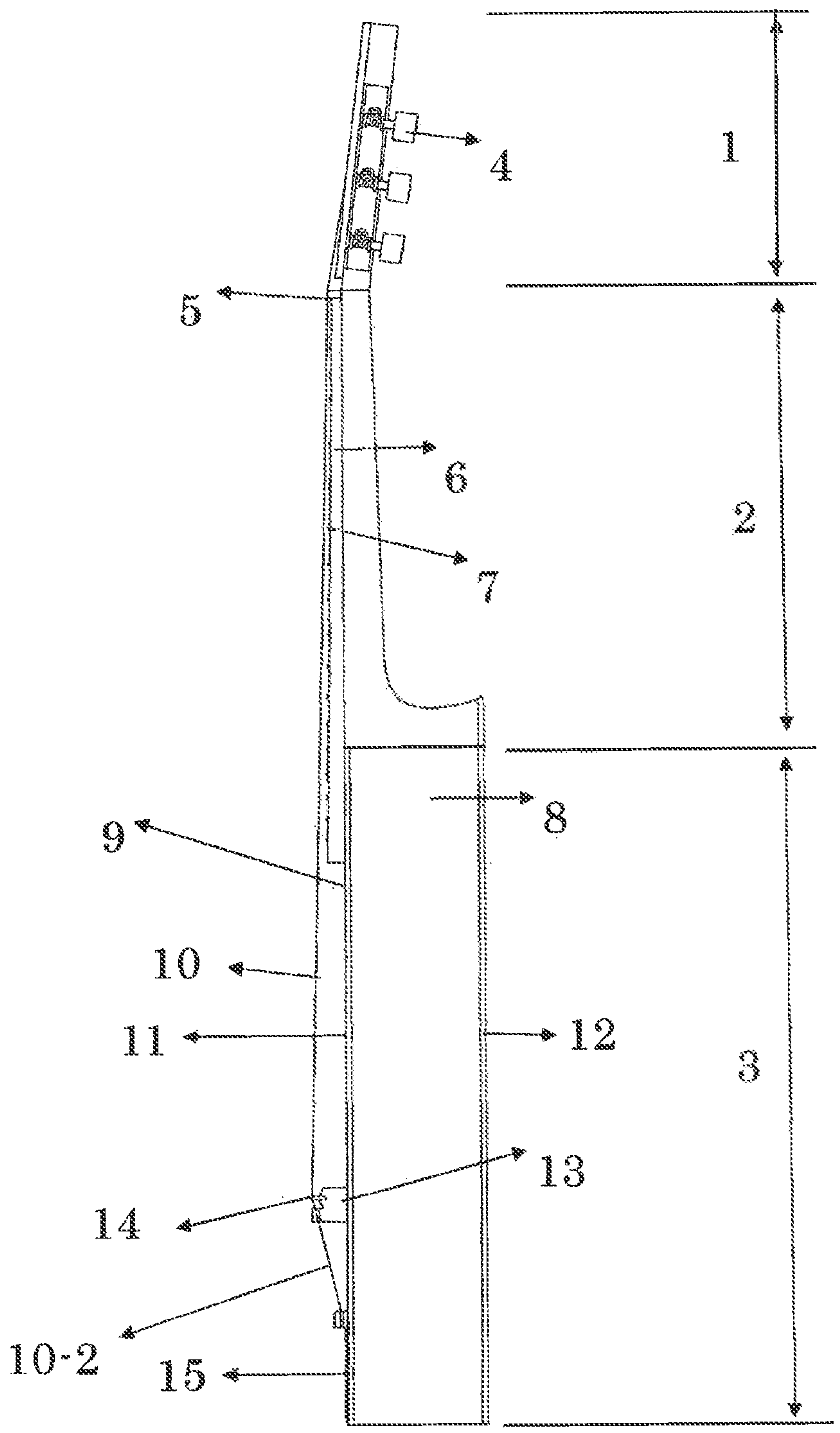
FIG. 2 is a side view illustrating one embodiment in which the present invention is applied to a string instrument.
Figure 3:
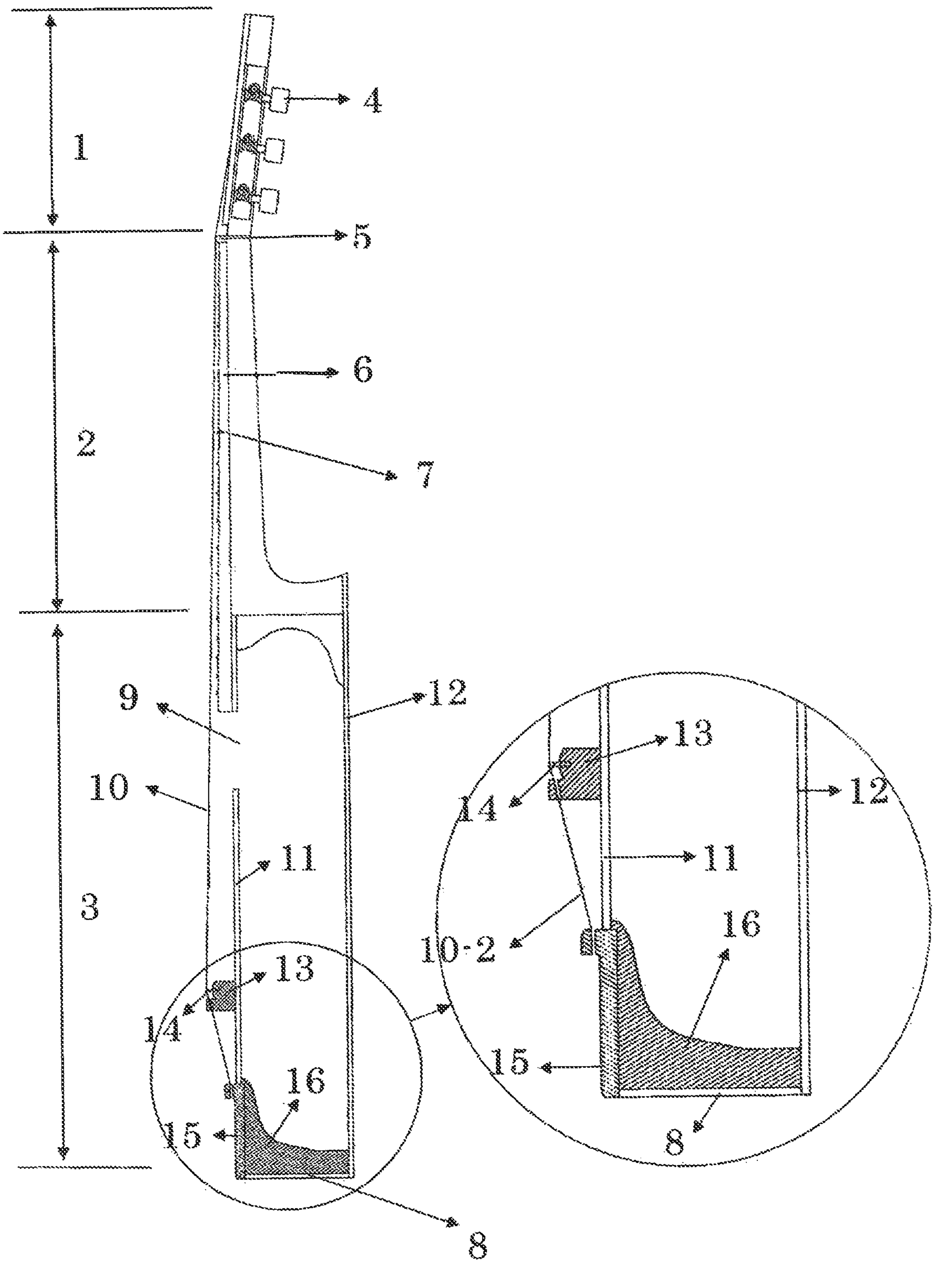
FIG. 3 is an enlarged side surface cross-section view illustrating one embodiment in which the present invention is applied to a string instrument.

In the following, the present invention shall be explained in detail using the embodiments shown in the drawings.

Figure 4:
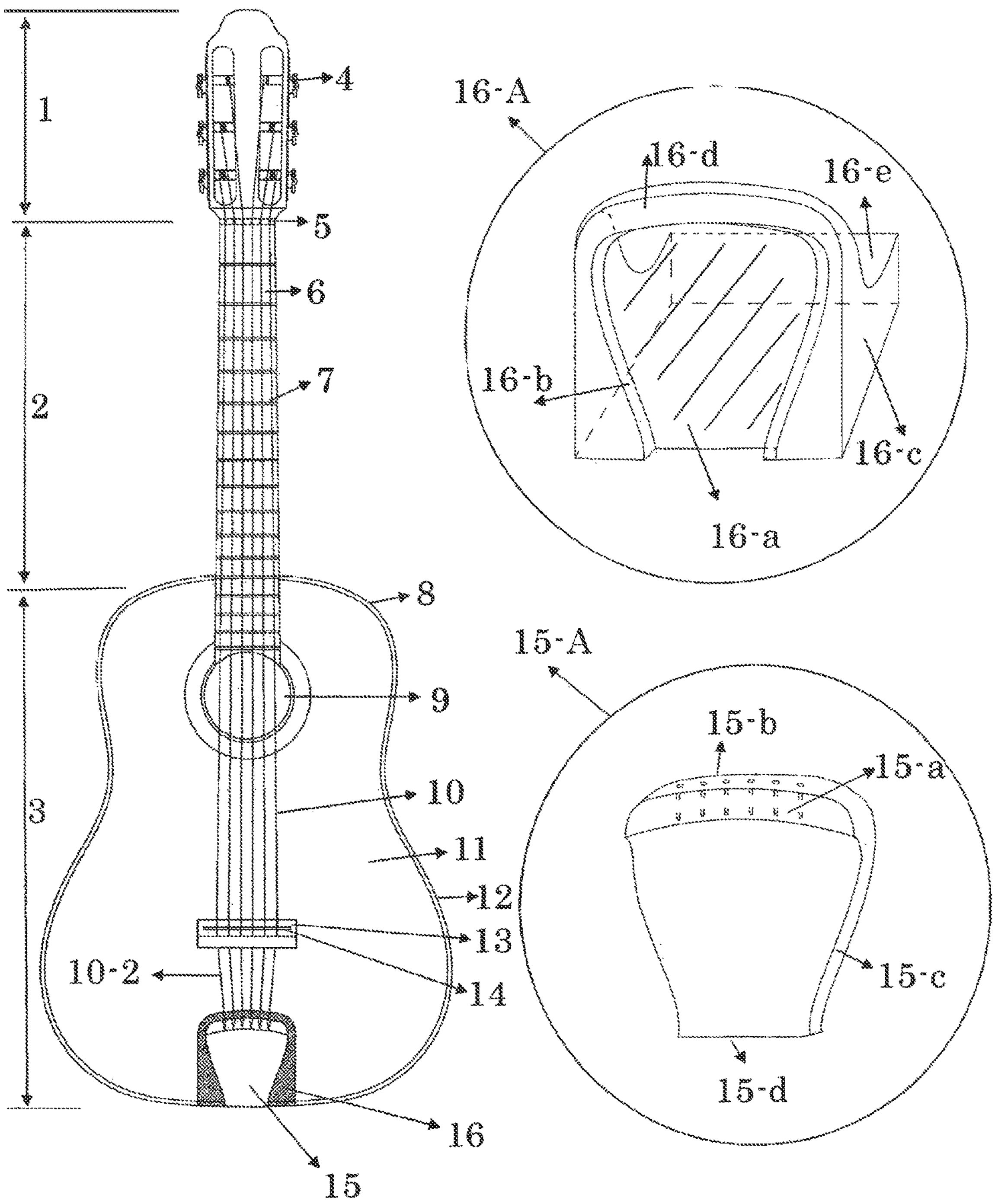
FIG. 4 presents enlarged front surface perspective views and an exemplary explanatory view illustrating one embodiment in which the present invention is applied to a string instrument.
Figure 5:
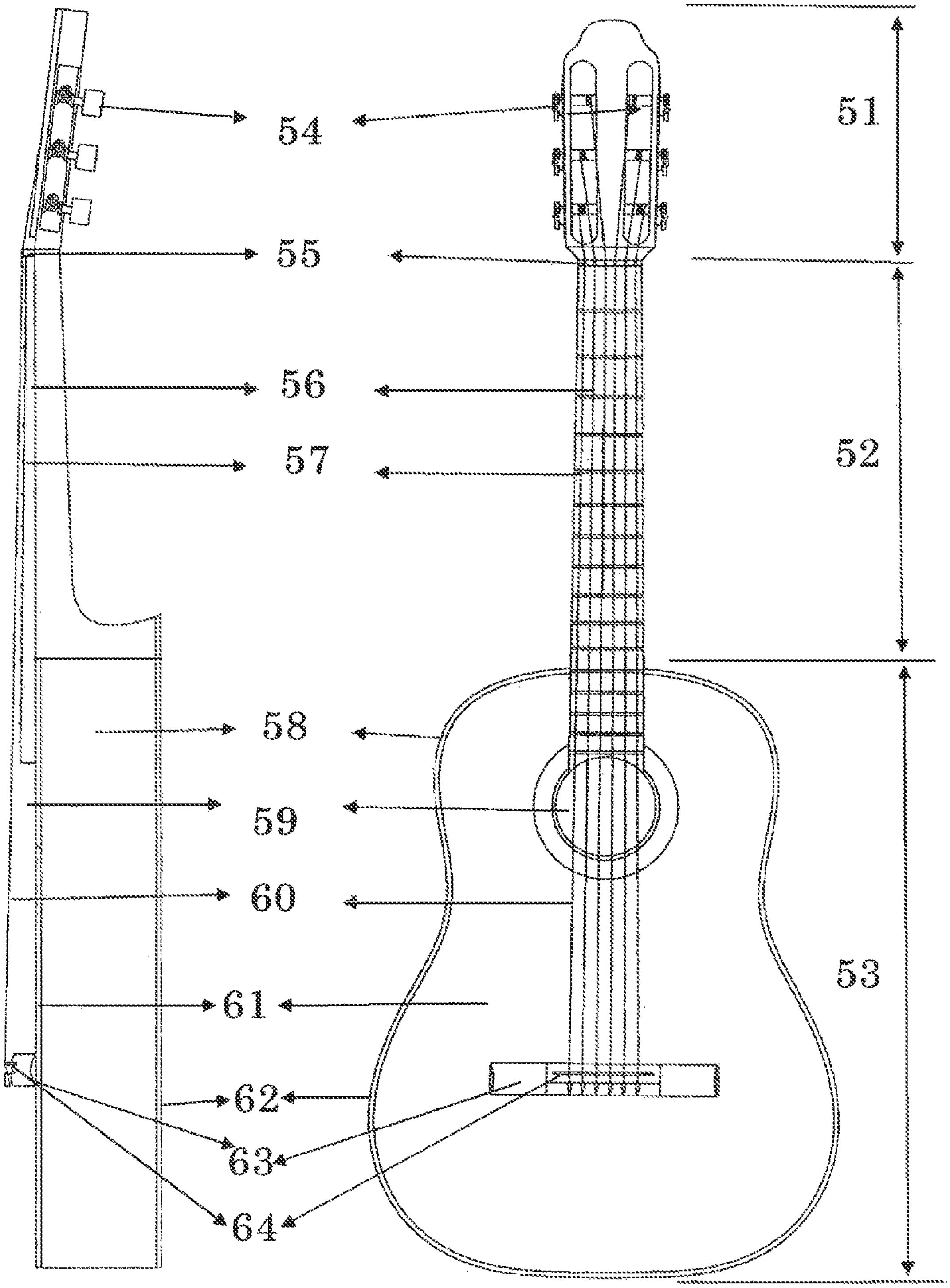
FIG. 5 is a front view and a side view of a conventional guitar.
Figure 6:
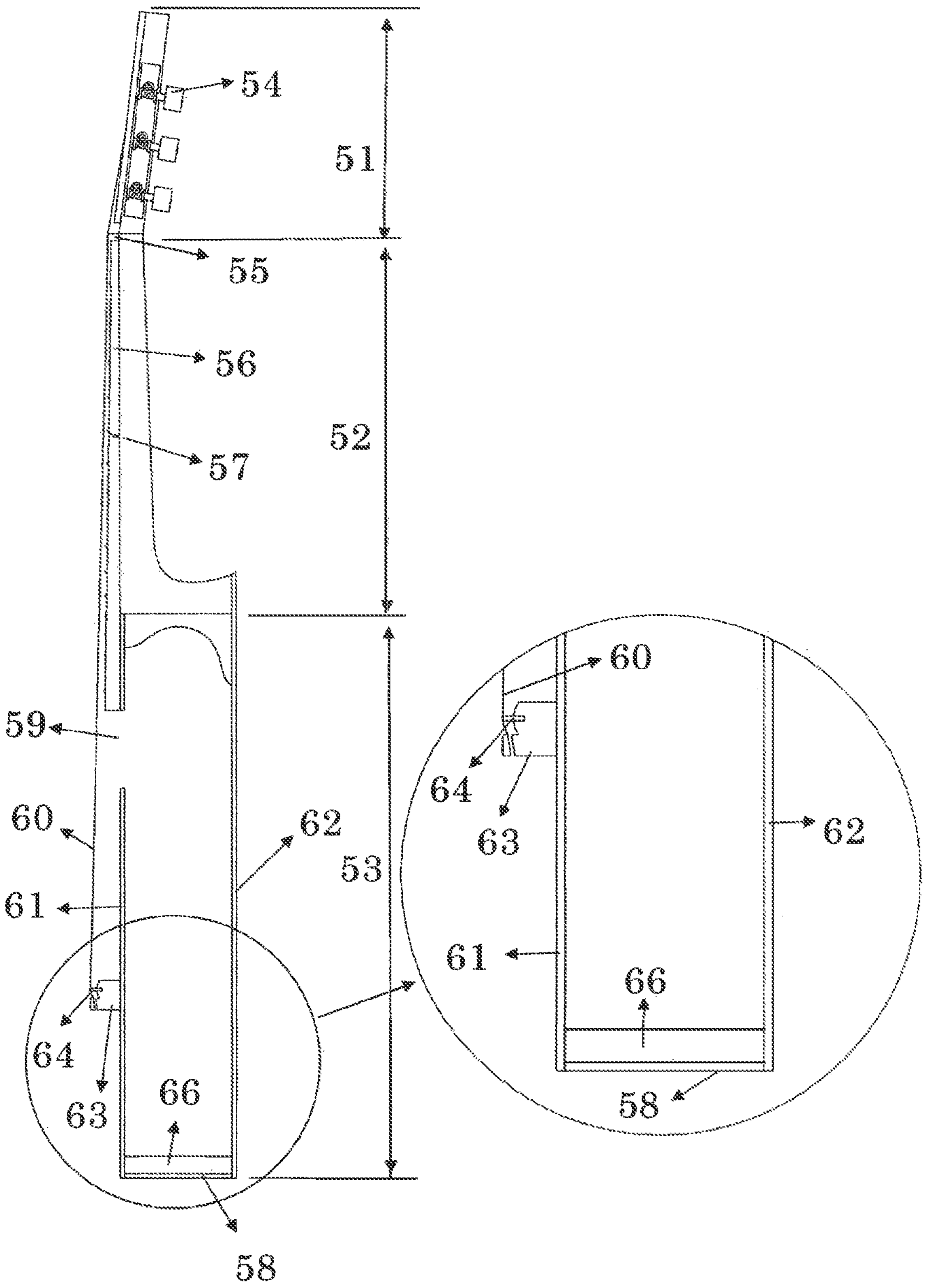
FIG. 6 is an enlarged side surface cross-section view of a conventional guitar.

FIG. 4 presents enlarged front perspective views and an exemplary explanatory view illustrating one embodiment in which the present invention is applied to a string instrument. In FIG. 4, a string instrument is formed from: a body portion (3) that is constituted by a front panel (11), a back panel (12), and a side panel (8) which are thin wooden panels, and that forms a space for resonating; a neck portion (2) that is connected to the body portion (3); a head portion (1) that is connected to an upper end of the neck portion (2), and that includes pegs (4); a string holding member (15) that is disposed at a lower end of the front panel (11); strings (10) that are extended across the neck portion (2), the strings being held at one end by the string holding member (15) and held at the other end by the pegs (4); a nut (5) that is disposed at an upper end of the neck portion (2) and that supports a middle portion of the strings (10); and a bridge (14) that is held on a saddle (13) disposed near the middle of the front panel (11). The string instrument also has a body reinforcement member (16) that is disposed on the inside of the body portion (3), and that has a joining surface which is adhered to the front panel (11), the back panel (12), and the side panel (8). An opposing surface of a string holding section of the string holding member (15) has a joining surface which is fixed and adhered to the front panel (11), the side panel (8), and the body reinforcement member (16).

Two left-right side panels (8) are bent into a guitar shape in a left-right symmetrical manner, and are abutted to each other at a bottom surface part. The neck portion (2) to which the head portion (1) is molded is connected to the top parts of the side panels (8), and the back panel (12), which is cut slightly larger than the shape of the body portion (3), is bonded to the back surface of the body portion (3), which creates a resonating space upon abutting the left-right side panels (8) to each other. After fixing and molding, this is fitted into a guitar-shaped mold.

At the bottom part on the inside of the body portion (3) in this state of being fitted into the mold, a back surface part (16-*e*) of the body reinforcement member is disposed and adhered to a lower part on an inner surface of the back panel (12) so that a body reinforcement member bottom surface part (16-*c*) is disposed so as to fit closely to an inner bottom surface part of the left-right side panels (8) on the inside of the body portion (3). At this time, the body reinforcement member (16) is disposed at the center of a bottom surface part of the body portion (3), and the size of the adhesion surfaces of the body reinforcement member bottom surface part (16-*c*) and the left-right side panels (8) are arranged so as to be equal at both the left and right side panels (8). Further, the width and length of a body reinforcement member front surface part (16-*d*), which is the joining surface with the front panel (11), are characterized by being provided in sizes which are 1.2 to 1.5 times greater than the width and length of a back surface part (15-*b*) of the string holding member (15).

By providing the width and length of the joining surface of the body reinforcement member (16) with the string holding member (15) in sizes which are 1.2 to 1.5 times greater than the width and length of the string holding member, the degree of adhesion between the body reinforcement member (16) and the front panel (11) is increased, and the transmission of vibration of the strings (10) to the front panel (11) is improved. In addition, the string holding member (15) can be stably held.

The front panel (11) which is cut to be slightly larger than the shape of the body portion (3) and in which a sound hole (9) is cut out, is adhered to the front surface of the body portion (3) to which the back panel (12) and the body reinforcement member (16) have been fixedly adhered. At this time, the front surface part (16-*d*) of the body reinforcement member (16) and a lower part on the inner surface of the front panel (11) are also closely fitted to each other and adhered.

From above the front panel (11) which has been fixedly adhered and completely molded, the thickness of the front panel (11) and the body reinforcement member front surface part (16-*d*) is evenly cut away to a depth of 2 to 6 mm, so as to create a shape in which the string holding member back surface part (15-*b*) fits. A body reinforcement member cut side surface part (16-*b*) corresponding to the cut away depth is adjusted so that the holes through which the strings are passed of a string holding section (15-*a*) of the string holding member (15) are maintained at an appropriate height from the front panel (11). A body reinforcement member cut front surface part (16-*a*) is formed with a size corresponding to a string holding section opposing surface (15-*b*) of the string holding member, and a string holding section side surface part (15-*c*) is formed with a size corresponding to the body reinforcement member cut side surface part (16-*b*), and the surfaces thereof are smoothly cut to the appropriate sizes. The opposing surface (15-*b*) of the string holding section (15-*a*) of the string holding member (15) is closely fitted and adhered to the cut front surface part (16-*a*) of the body reinforcement member (16), and the side surface (15-*c*) is closely fitted and adhered to the cut side surface part (16-*b*).

The string holding member (15) is fixedly adhered to and integrated with the body reinforcement member (16) upon cutting away a portion of the front panel (11) and the body reinforcement member (16), and thereby a string instrument which can be stably held over a long period and which exhibits obviously high durability can be provided.

Since the string holding section (15) fits closely, via the body reinforcement section (16), to all of the members which constitute the body portion (3), vibration of the strings (10) can be effectively transmitted to the resonating space section of the body portion (3). Therefore, the sound quality of the string instrument can be remarkably improved and the musical performance expressive capability can be enhanced, and further a robust sound volume can be emitted with a single instrument without depending on an electric amplifier.

The saddle (13) is adhered to an appropriate position between the sound hole (9) of the front panel (11) and the string holding member (15). In the saddle (13), holes through which the strings (10) are passed, and a groove into which the bridge (14) made of resin or bone materials is fitted to an appropriate depth are carved.

After fixing, the entirety of the string instrument is polished with sandpaper or the like and then a coating is applied.

If nylon gut is used for the material of the strings (10) as in a classic guitar or a ukulele, etc., one end of the strings (10) is passed through the string holding section (15-*a*) of the string holding member and then fixed by winding an appropriate number of times depending on the thickness thereof. The other end is passed through the holes of the saddle (13) through which the strings are to be passed, carried over the bridge (14), extended across a fingerboard (6) of the neck portion (2) and over the nut (5), and wound around the pegs (4). The pegs (4) are rotated to adjust the tension of the strings (10), and thereby the prescribed musical interval of each string is obtained.

If the material of the strings (10) is metal as in an acoustic guitar or a bass, etc., a round metallic stopper is attached to one end of the strings (10), and thus if the end of the strings (10) at which the stopper is not attached is passed from a lower part of the string holding section (15-*a*) of the string holding member, the strings are fixed by the string holding section (15-*a*). The end at which the stopper is not attached is similarly passed through the holes of the saddle (13) through which the strings are to be passed, carried over the bridge (14), extended across the fingerboard (6) of the neck portion (2) and over the nut (5), and wound around the pegs (4). The pegs (4) are rotated to adjust the tension of the strings (10), and thereby the prescribed musical interval of each string is obtained.

Figure 7:
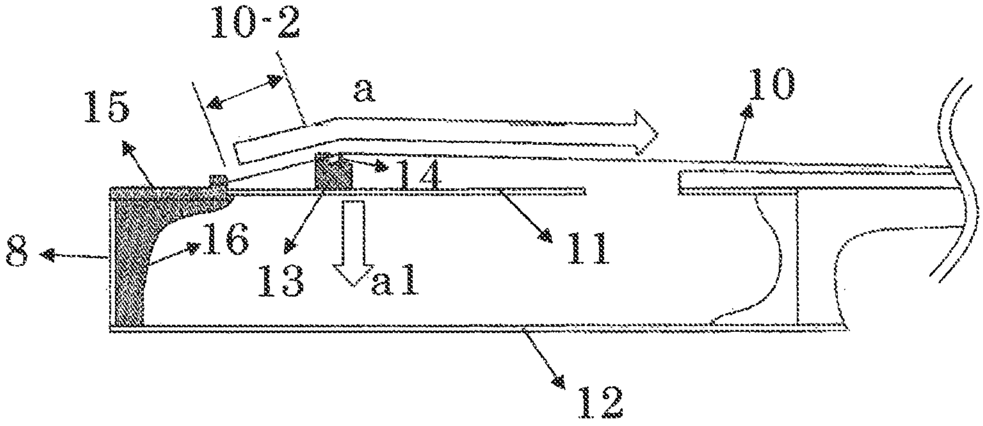
FIG. 7 is a view illustrating one embodiment in which the present invention is applied to a string instrument, which shows the dispersed forces with respect to the tension of the strings.
Figure 8:
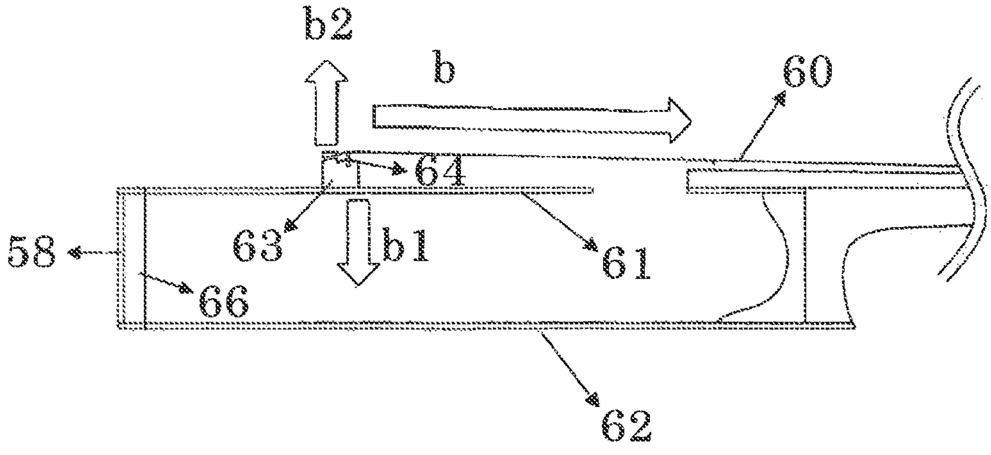
FIG. 8 is a view which shows the dispersed forces with respect to the tension of the strings in a conventional guitar.
Figure 9:
FIG. 9 is a photograph showing an example of a string holding member of an electric guitar.
Figure 10:
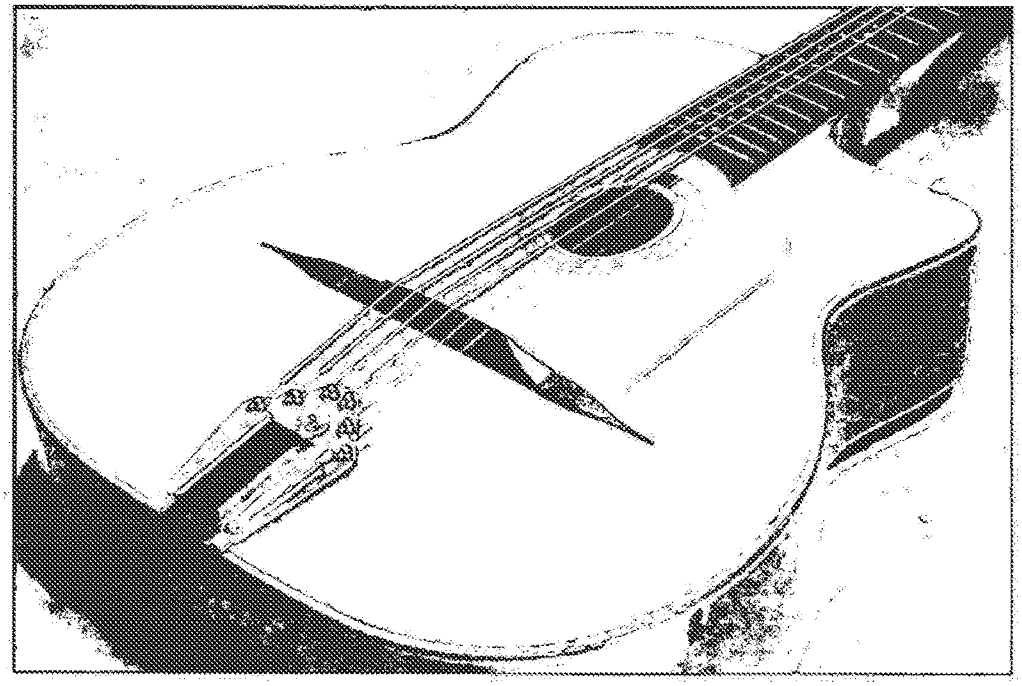
FIG. 10 is a photograph showing an example of a guitar which includes a resonating space and a string holding member.

Among the tension (b) of the strings (60) shown in FIG. 8, the force (b2) pulling away the saddle (63) which conventionally existed can be removed, and an excessive force (b1) which causes the front panel (61) to become depressed can be alleviated. In addition, since the string holding member (15) is fixedly adhered to and integrated with the front panel (11), the side panels (8), and the body reinforcement member (16) as shown in FIG. 7, the tension (a) of the strings (10) is dispersed to the front panel (11), the side panels (8), and the body reinforcement member (16), and the back panel (8). Due to these effects, forces in directions leading the instrument to break caused by the tension of the strings (10) in a conventional string instrument are eliminated or dispersed, and thus an improved structure which exhibits superior strength, durability, and lifespan can be provided.

The strings (10-2) between the bridge (14) and the string holding member (15) as shown in FIG. 1, which did not exist in conventional classic/acoustic guitars and the like, fulfill a role as resonance strings, and can resonate with a performed sound so as to amplify the sound volume and strengthen a harmonic overtone. Therefore, an acoustic effect which is clearly superior to that of a conventional string instrument can be obtained, and an excellent sound quality can be provided.

The strings (10) are held with the string holding member (15), and the saddle (13) functions to prevent any deviation between the bridge (14) and the strings (10). Since a force (b2) that pulls on the adhesive surface with the front panel (11) is eliminated, the embodiment of the saddle (13) can be reduced in size, and the decorative degree of freedom can be increased. Variation of the string holding member is also possible, as in the exemplary front views (15-1, 15-2, 15-3) shown in FIG. 1. Thus, an extremely innovative, characteristic, and unique outer appearance which did not exist in conventional string instruments can be imparted.

The embodiments explained above show examples applied to a guitar, but the present invention is not limited thereto, and can also be applied to other string instruments such as a ukulele, a bass, and the like.

INDUSTRIAL APPLICABILITY

The present invention is useful as a string instrument which can obtain an acoustic effect which is clearly superior to that of a conventional string instrument, and which can provide excellent sound quality. Further, the present invention can provide an improved instrument which exhibits superior strength, durability, and lifespan.

REFERENCE SIGNS LIST

1: head portion
2: neck portion (neck)
3: body portion (body)
4: pegs (pegs)
5: nut
6: fingerboard (fingerboard)
7: fret
8: side panel (side)
9: sound hole
10: string
10-2: string (resonance string)
11: front panel (top)
12: back panel (back)
13: saddle
14: bridge
15: string holding member (tail piece)
16: body reinforcement member (end block)
15-1: exemplary front view 1 of string holding member (15)
15-2: exemplary front view 2 of string holding member (15)
15-3: exemplary front view 3 of string holding member (15)
15-A: three-dimensional explanatory view of string holding member (15)
  15-*a*: string holding section of string holding member
  15-*b*: opposing surface part of 15-*a*
  15-*c*: string holding member side surface part
  15-*d*: string holding member bottom surface part
16-A: three-dimensional explanatory view of body reinforcement member (16)
  16-*a*: body reinforcement member cut front surface part
  16-*b*: body reinforcement member cut side surface part
  16-*c*: body reinforcement member bottom surface part
  16-*d*: body reinforcement member front surface part
  16-*e*: body reinforcement member back surface part
51: head portion
52: neck portion (neck)
53: body portion (body)
54: pegs (pegs)
55: nut
56: fingerboard (fingerboard)
57: fret
58: side panel (side)
59: sound hole
60: string
61: front panel (top)
62: back panel (back)
63: saddle
64: bridge
65: body reinforcement member (end block)
a: string tension according to present invention
a1: force according to present invention acting in direction in which string tension pushes front panel
b: conventional string tension
b1: conventional force acting in direction in which string tension pushes front panel
b2: conventional force acting in direction in which string tension pulls off saddle

The invention claimed is:

1. A string instrument comprising:

a body portion that is constituted by a front panel, a back panel, and a side panel, and that forms a space for resonating;

a neck portion that is connected to the body portion;

a head portion that is connected to an end of the neck portion, and that comprises pegs;

strings that are extended across the neck portion, the strings being held at one end by the pegs;

a nut that is disposed at one end of the neck portion and that supports a middle portion of the strings; and a bridge that is held on a saddle disposed near a middle of the front panel, wherein the string instrument is characterized by comprising a string holding member that is disposed at an end of the front panel and that holds an end of the strings, and a body reinforcement member that has a joining surface which is adhered to the front panel, the back panel, and the side panel on an inside of the body portion, and wherein an opposing surface of a string holding section of the string holding member has a joining surface which is fixed and adhered to the front panel, the side panel, and the body reinforcement member.

2. The string instrument according to claim 1, wherein portions of the front panel and the body reinforcement member are cut away, and the string holding member is disposed in and fixedly adhered to the body reinforcement member.

3. The string instrument according to claim 1, wherein a width and a length of a joining surface of the body reinforcement member with the string holding member are provided in sizes which are 1.2 to 1.5 times greater than a width and a length of the string holding member.

* * * * *